United States Patent [19]
Kamei

[11] Patent Number: 5,523,657
[45] Date of Patent: Jun. 4, 1996

[54] CONVERGENCE CORRECTION APPARATUS FOR PICTURE IMAGE DISPLAY DEVICE

[75] Inventor: Kenji Kamei, Saitama-ken, Japan

[73] Assignee: Kabushiki Kaisha Toshiba, Kawasaki, Japan

[21] Appl. No.: 240,582

[22] Filed: May 10, 1994

[30]     Foreign Application Priority Data

May 10, 1993   [JP]   Japan .................................. 5-108358

[51] Int. Cl.⁶ .................................................. H01J 29/51
[52] U.S. Cl. ...................................................... 315/368.18
[58] Field of Search ........................ 315/368.11, 368.18, 315/368.19, 368.21, 368.22, 368.23; 348/807, 745

[56]                References Cited

U.S. PATENT DOCUMENTS

4,611,151   9/1986   Hoover et al. ........................... 315/368

Primary Examiner—Theodore M. Blum
Attorney, Agent, or Firm—Cushman Darby & Cushman

[57] ABSTRACT

A convergence correction apparatus for a picture image display device including a picture tube provided with an anode and a convergence coil, for displaying a picture image, a receiver for receiving a composite video signal, a separator for separating a horizontal periodic pulse and a vertical periodic pulse from the composite video signal, a convergence unit responsive to the horizontal periodic pulse for generating a high voltage convergence signal to be applied to the anode of the picture tube, a detector for detecting a fluctuation of the high voltage convergence signal, a ripple signal generator for generating a high voltage ripple signal corresponding to the fluctuation, a correction signal generator for generating a convergence correction signal including at least one of a horizontal periodic sawtooth wave signal, a vertical periodic sawtooth wave signal and a parabolic wave signal based on the horizontal periodic pulse and a vertical periodic pulse, an adjuster for adjusting the convergence correction signal by arithmetically processing the convergence correction signal with the high voltage ripple signal, and a supply unit for supplying the convergence coil of the picture tube with the adjusted convergence correction signal to cancel distortions of a picture image displayed in associated with the picture tube.

3 Claims, 10 Drawing Sheets

CONVERGENCE CORRECTION APPARATUS FOR PICTURE IMAGE DISPLAY DEVICE

FIELD OF THE INVENTION

The present invention generally relates to a convergence correction apparatus for a picture image display device, and more particularly, to a convergence correction apparatus for a projection type picture image display device of a color television receiver for effectively removing a picture image distortion produced on a display screen due to high voltage fluctuations accompanied with a brightness change on the display screen.

BACKGROUND OF THE INVENTION

Screens of color television receivers have been rapidly upsized, as the satellite broadcasting service, video disc apparatus, S-VHS type VCRs, regular type VCRs, a rental video disc service and the like come into wide use in recent years.

In this context, screens of direct view CRT-type television receivers have been upsized to around a 30-inch diagonal screen or more. However, the weight of television receivers abruptly increases, as the diagonal screen size exceeds over the 30-inches. Thus, the direct view CRT-type television receivers with such 30-inch diagonal screens have reached a limit of practical use.

On the contrary, projection color television receivers can be designed at a relatively compact in size, as an image on a picture tube (CRT) is projected onto a screen by enlarging the image through lenses. Due to such a merit, the projection color television receivers dominate in television receivers with screens in the diagonal size exceeding over 40-inches.

In such projection color television receivers, red (R), green (G) and blue (B) monochrome projection picture tubes are aligned in a row with each other. Then picture images on these projection picture tubes are projected on a display screen by enlarging the images through an optical system comprised of lenses, reflecting mirrors and the like.

In the projection type color television receivers with the construction as described above, a convergence correction apparatus is normally provided for correcting a color discrepancy and a color irregularity caused by orbital offsets of electron beams resulting from a misalignment among the R, G and B monochrome projection picture tubes and an effect of the earth magnetic field to the electron beams.

Figure 1A:
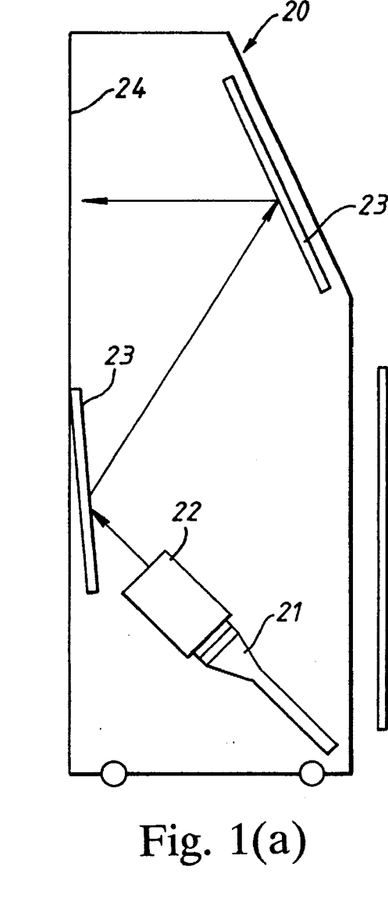
FIGS. 1(a) and 1(b) is a diagram showing the construction of the projection section of a conventional projection color television receiver.
Figure 1B:
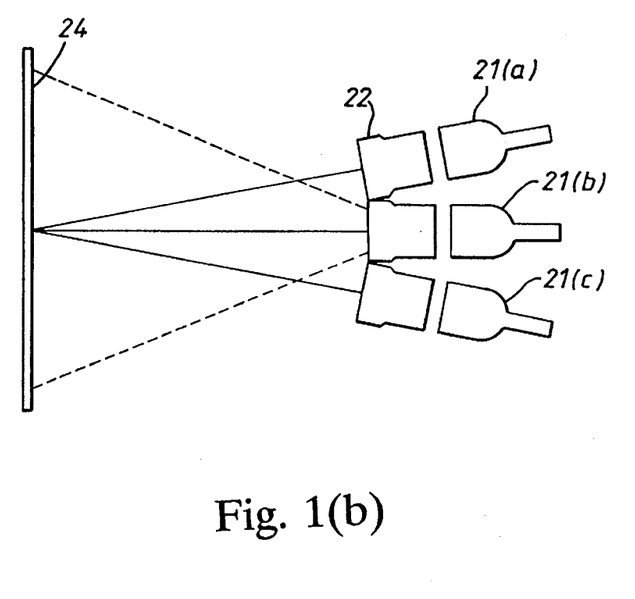

In FIGS. 1, FIG. 1(a) shows a side view of a projection color television receiver, while FIG 1(b) shows a plan view illustrating an aligning state of the projection picture tubes. In FIG. 1(b), R, G and B monochrome projection picture tubes 21(a), 21(b) and 21(c) are aligned in a row with each other. Further, the R projection picture tube 21(a) and the B projection picture tube 21(c) are directed inwardly in connection with an arrangement of optical paths of their optical systems.

A projection picture tube 22 is associated with each of the R, G and B projection picture tubes 21(a), 21(b) and 21(c). Thereby picture images on the R, G and B projection picture tubes 21(a), 21(b) and 21(c) are projected on a display screen 24 by being enlarged through the projection lenses 22 and further a set of reflecting mirrors 23.

Figure 2A:
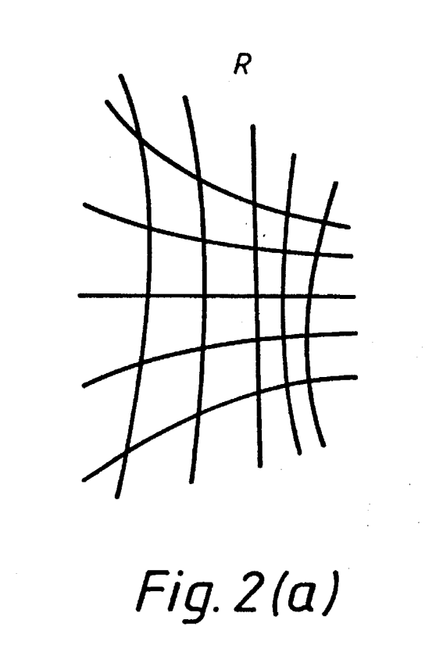
FIGS. 2(a), 2(b) and 2(c) are diagrams showing R, G and B cross hatching patterns without convergence correction of a conventional projection color television receiver.
Figure 2B:
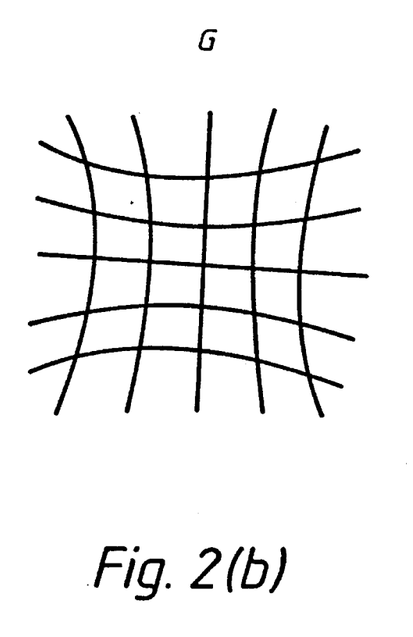
Figure 2C:
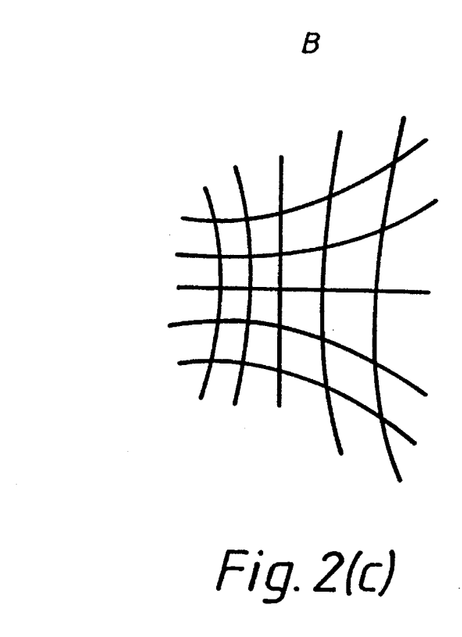

Generally, in order to adjust color discrepancies and/or color irregularities of picture images on a display screen, the picture image is adjusted its convergence characteristics by checking cross hatching patterns projected on the display screen from cross hatching pattern generators respectively associated with the R, G and B monochrome projection picture tubes 21(a), 21(b) and 21(c). The states of the cross hatching patterns on the R, G and B monochrome projection picture tubes 21(a), 21(b) and 21(c) without any convergence correction are shown in FIGS. 2(a), 2(b) and 2(c), respectively.

R, G and B monochrome beams radiated from the R, G, B projection picture tubes 21(a), 21(b) and 21(c) are applied on the screen 24 through the projection lenses 22 and the reflecting mirrors 23. Those projected images on the screen are distorted as illustrated in FIGS. 2(a), 2(b) and 2(c) due to mainly each attribute of the optical systems.

Figure 3A:
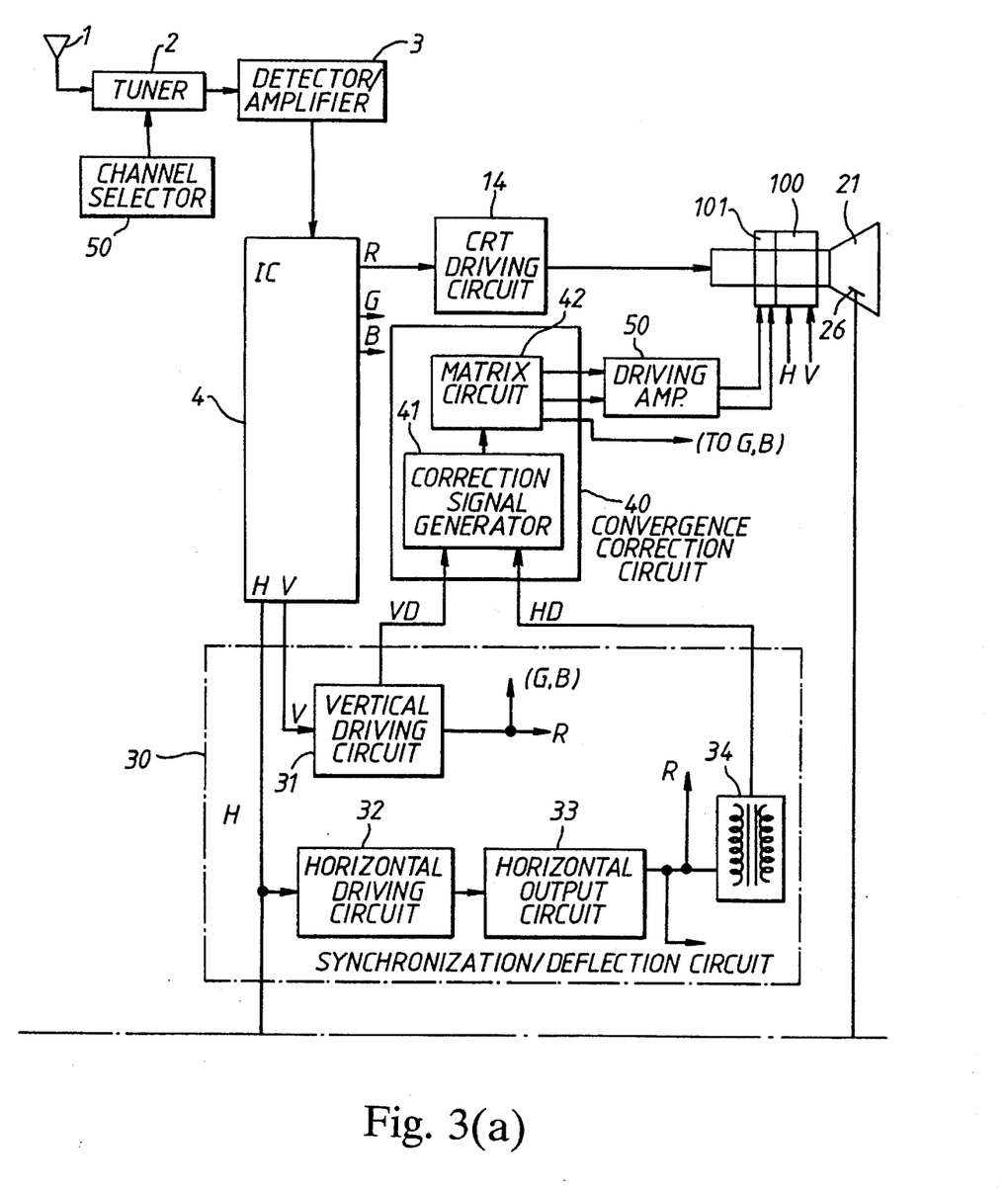
FIGS. 3(a) and 3(b) is a block diagram showing a convergence correction apparatus of a conventional projection color television receiver.
Figure 3B:
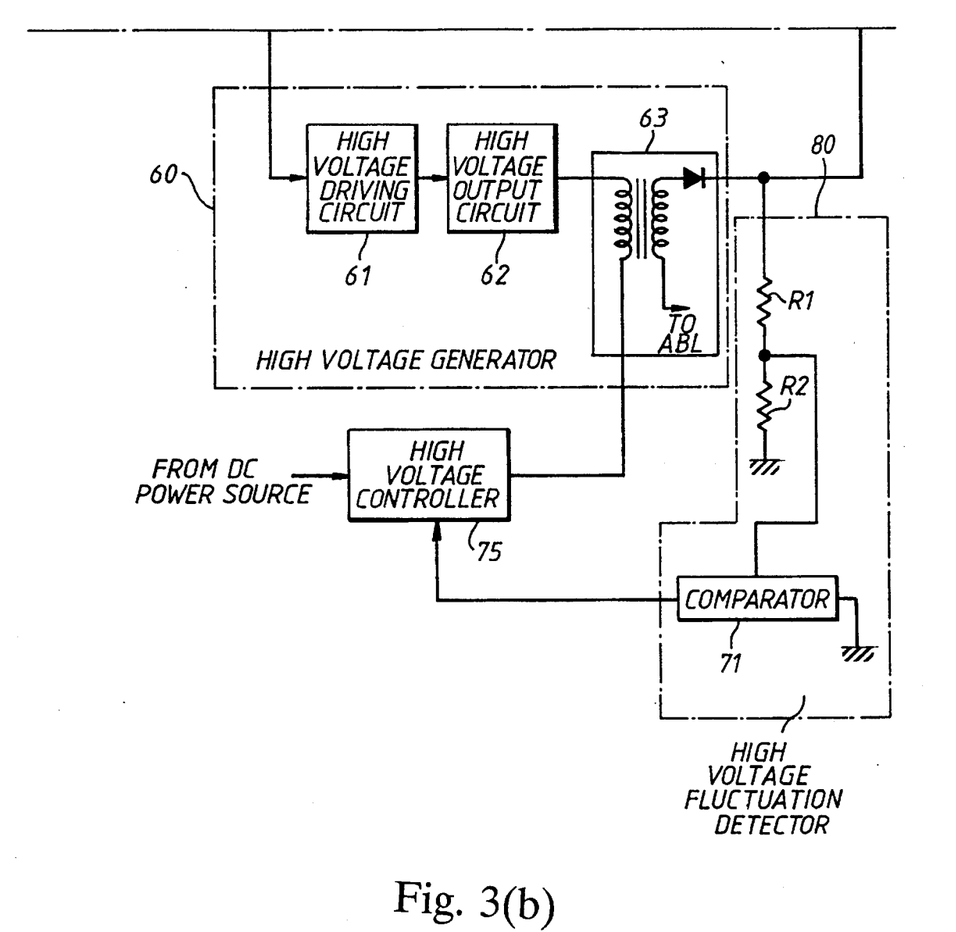

Such a convergence correction apparatus is used for electrically correcting optical distortions of lenses. For example the convergence correction apparatus is constructed as shown in FIGS. 3(a) and 3(b). FIGS. 3(a) and 3(b) typically show such a circuit for the R (red) projection picture tube 21(a), while circuits for the G (green) and the B (blue) projection picture tubes are also constructed in a similar manner the circuit as shown in FIGS. 3(a) and 3(b).

In FIG. 3, the reference numeral 1 denotes an antenna, the reference numeral 2 denotes a tuner, the reference numeral 3 denotes a detector/amplifier means, the reference numeral 4 denotes an integrated circuit (hereinafter referred as to IC) 4 for a video chroma processing, and the reference numeral 14 denotes a driving circuit for amplifying powers of R, G and B signals from the IC 4 and supplying them to the R, G and B projection picture tubes 21(a), 21(b) and 21(c), respectively.

A horizontal driving pulse H output from a synchronization/deflection processing circuit in the IC 4 is supplied to a horizontal driving circuit 32 in a synchronization/deflection circuit 30. The output of the horizontal driving circuit 32 is then supplied to a horizontal output circuit 33.

The output of the horizontal output circuit 33 is supplied to a horizontal deflection coil 100 and also to a horizontal output transformer 34. The output of the horizontal output transformer 34 is then supplied to an intermediate voltage circuit and a low voltage circuit (not shown) and the like.

Further, a horizontal periodic driving pulse signal HD is supplied to a convergence correction circuit 40 from the horizontal output transformer 34.

On the other hand, a vertical driving pulse signal V is supplied to a vertical output circuit 31. The output of this vertical output circuit 31 is then supplied to a vertical deflection coil 100. Further, a vertical periodic driving pulse signal VD is supplied from the vertical output circuit 31 to the convergence correction circuit 40.

The convergence correction circuit 40 is composed of a correction signal generator 41 which generates a horizontal sawtooth wave, a vertical sawtooth wave and a parabolic wave based on the horizontal pulse signal HD and the vertical pulse signal VD, and a matrix circuit 42 which generates signals for correcting various raster distortions by appropriately combining some or all of the horizontal periodic sawtooth wave, the vertical periodic sawtooth wave and the parabolic wave.

The output of this convergence correction circuit 40 is supplied to a driving amplifier 50 which drives the R, G, B projection picture tubes 21(a), 21(b) and 21(c). The output of the driving amplifier 50 is supplied to each convergence coil 101 provided for the R, G, B projection picture tubes 21(a), 21(b) and 21(c). In practical applications, such a driving amplifier is needed for each of horizontal and vertical deflections of the projection picture tubes. Thus six amplifiers are required in total for all of the R, G, B projection picture tubes 21(a), 21(b) and 21(c))

The horizontal driving pulse signal H is also supplied to a high voltage generator 60. The high voltage output from the high voltage generator 60 is then obtained via a flyback transformer 63 based on the horizontal driving pulse H. This high voltage output is supplied to each anode 26 of the R, G, B projection picture tubes 21(a), 21(b) and 21(c). This high voltage is stepped down by a voltage divider comprising resistors R1 and R2. The divided voltage is then supplied to a comparator 71. Corresponding to fluctuations of the high voltage, a high voltage fluctuating component obtained by comparing with a reference voltage in the comparator 71 is supplied to a high voltage controller 75 comprising a control transistor, a saturable reactor and the like, so that a voltage across the primary coil of the flyback transformer 63 is controlled in response to the high voltage fluctuation. The high voltage controller 75 and a high voltage fluctuation detector 80 comprised of the resistor type voltage divider and the compsrator 71 for comparing the divided voltage with the reference voltage constitute a voltage stabilizer.

By the way, in case of the conventional convergence correction apparatus, as shown in FIG. 3, there is such a problem that the high voltage stabilizer can not follow a rapid change of the brightness level on a display screen.

Figure 4:
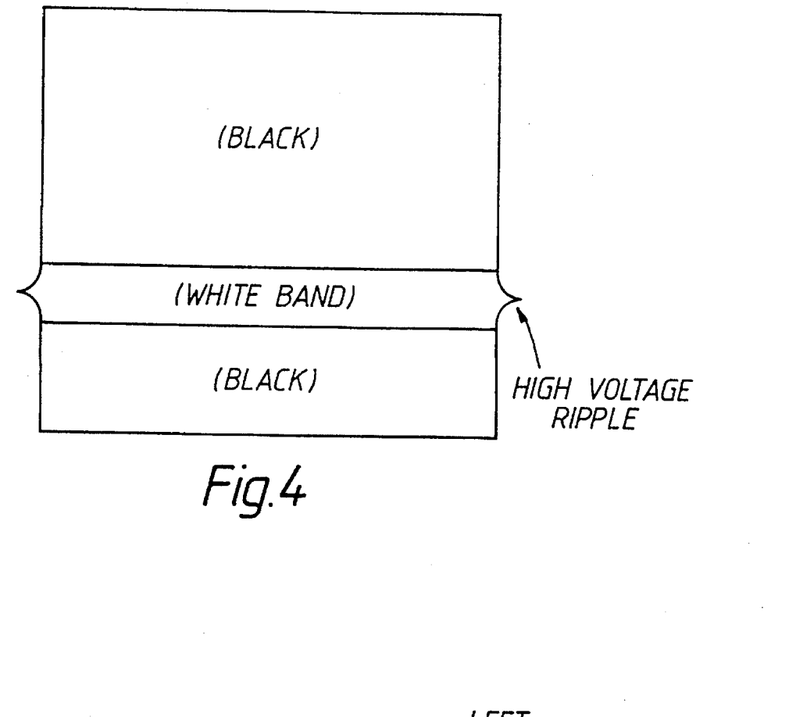
FIG. 4 is a diagram for explaining a picture image with high voltage ripple produced accompanying with brightness change on a conventional projection type color television receiver.

In particular, when an image data has a 100% brightness change from a black level to a white level, as illustrated in FIG. 4, a distortion of a picture image extending laterally to both sides due to a white band high voltage ripple is observed.

If it is attempted to correct image distortions on the screen only by means of convergence corrections, general optical distortions can be corrected in relatively easy. However, the distortion due to the white band high voltage ripple can not respond to the convergence correction means. As a result, three color beams of R, G and B can not be adequately superposed to each other on the display screen.

As described above, as to such a picture image distortion due to high voltage fluctuations, the high voltage fluctuation was attempted to remove by a high voltage stabilizer in a conventional convergence correction apparatus.

However, there was such a problem that the high voltage stabilizer could not fully respond to the high voltage fluctuation accompanied with a brightness change.

Further if it is attempted to correct a picture image distortion resulting from the high voltage fluctuation only by the convergence correction apparatus used for correcting general optical distortion corrections, the high voltage fluctuation resulting from the brightness change couldn't be corrected. Therefore, R, G and B color lights could not be superposed to each other on the display screen.

SUMMARY OF THE INVENTION

It is, therefore, an object of the present invention to provide a convergence correction apparatus which is able to remove a distortion due to a rapid change of a brightness level on a display screen.

In order to achieve the above object, a convergence correction apparatus according to one aspect of the present invention includes a picture tube provided with an anode and a convergence coil, for displaying a picture image, a receiver for receiving a composite video signal, a separator for separating a horizontal periodic pulse and a vertical periodic pulse from the composite video signal, a convergence unit responsive to the horizontal periodic pulse for generating a high voltage convergence signal to be applied to the anode of the picture tube, a detector for detecting a fluctuation of the high voltage convergence signal, a ripple signal generator for generating a high voltage ripple signal corresponding to the fluctuation, a correction signal generator for generating a convergence correction signal including at least one of a horizontal periodic sawtooth wave signal, a vertical periodic sawtooth wave signal and a parabolic wave signal based on the horizontal periodic pulse and a vertical periodic pulse, an adjuster for adjusting the convergence correction signal by arithmetically processing the convergence correction signal with the high voltage ripple signal, and a supply unit for supplying the convergence coil of the picture tube with the adjusted convergence correction signal to cancel distortions of a picture image displayed in associated with the picture tube.

According to the present invention, it becomes possible not only to constantly remove high voltage distortions of picture images at a real time operation by performing a convergence correction which oppositely acts on a picture image distortion resulting from an abrupt change of a brightness level, but also to precisely remove optical distortions, which are intrinsic objects of the convergence correction.

Thus the convergence correction apparatus according to the present invention can present a high quality picture image without deteriorated by color discrepancies, image distortions and the like on a display screen.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the FIGS. 5(a) through 9. Throughout the drawings, reference numerals or letters in FIGS. 1(a) through 4 will be used to designate like or equivalent elements for simplicity of explanation, Referring now to FIGS. 5(a) and 5(b), a circuit diagram showing one embodiment of a convergence correction apparatus according to the present invention will be described in detail.

Figure 5A:
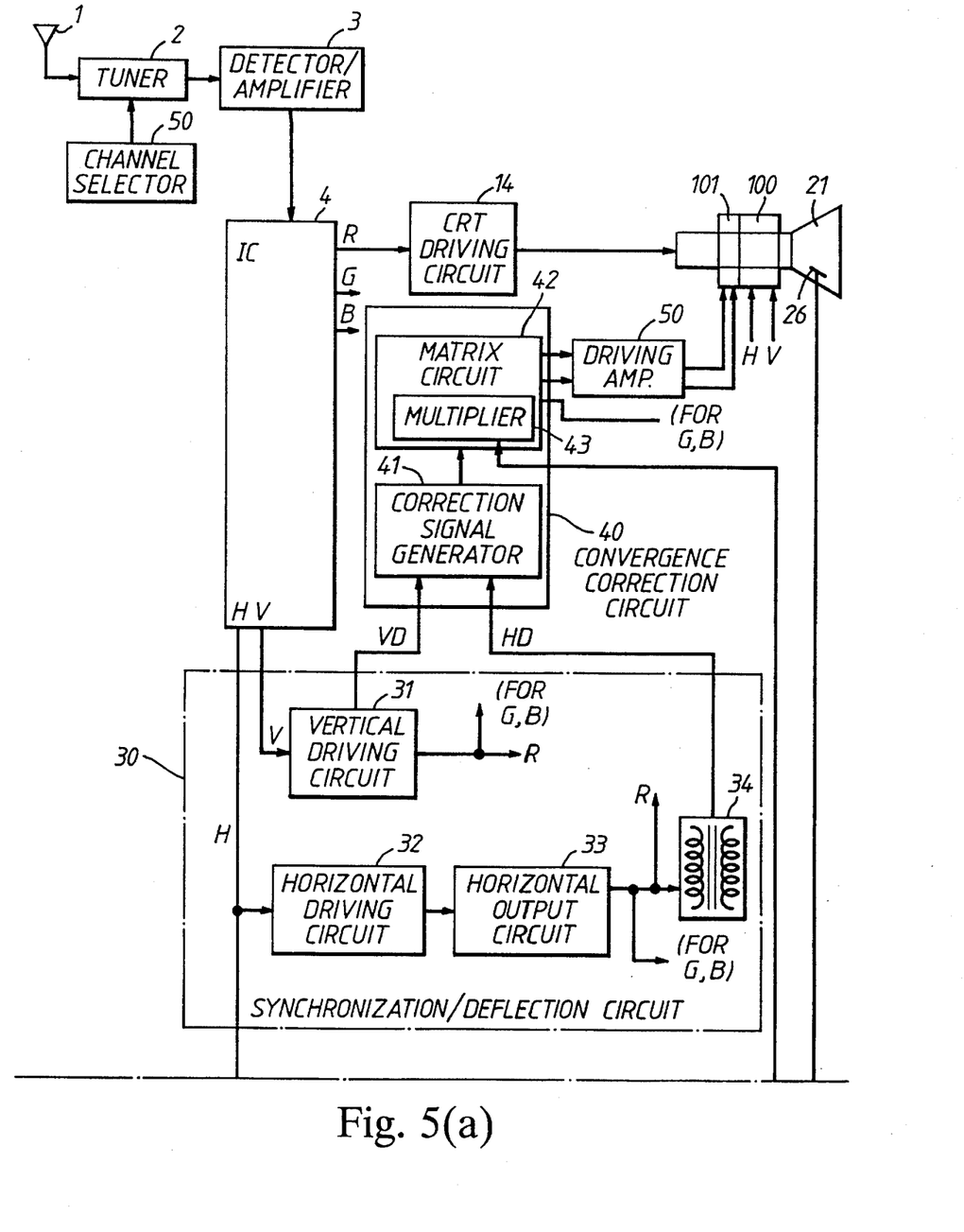
FIGS. 5(a) and 5(b) is a block diagram showing a preferred embodiment of a convergence correction apparatus according to the present invention.
Figure 5B:
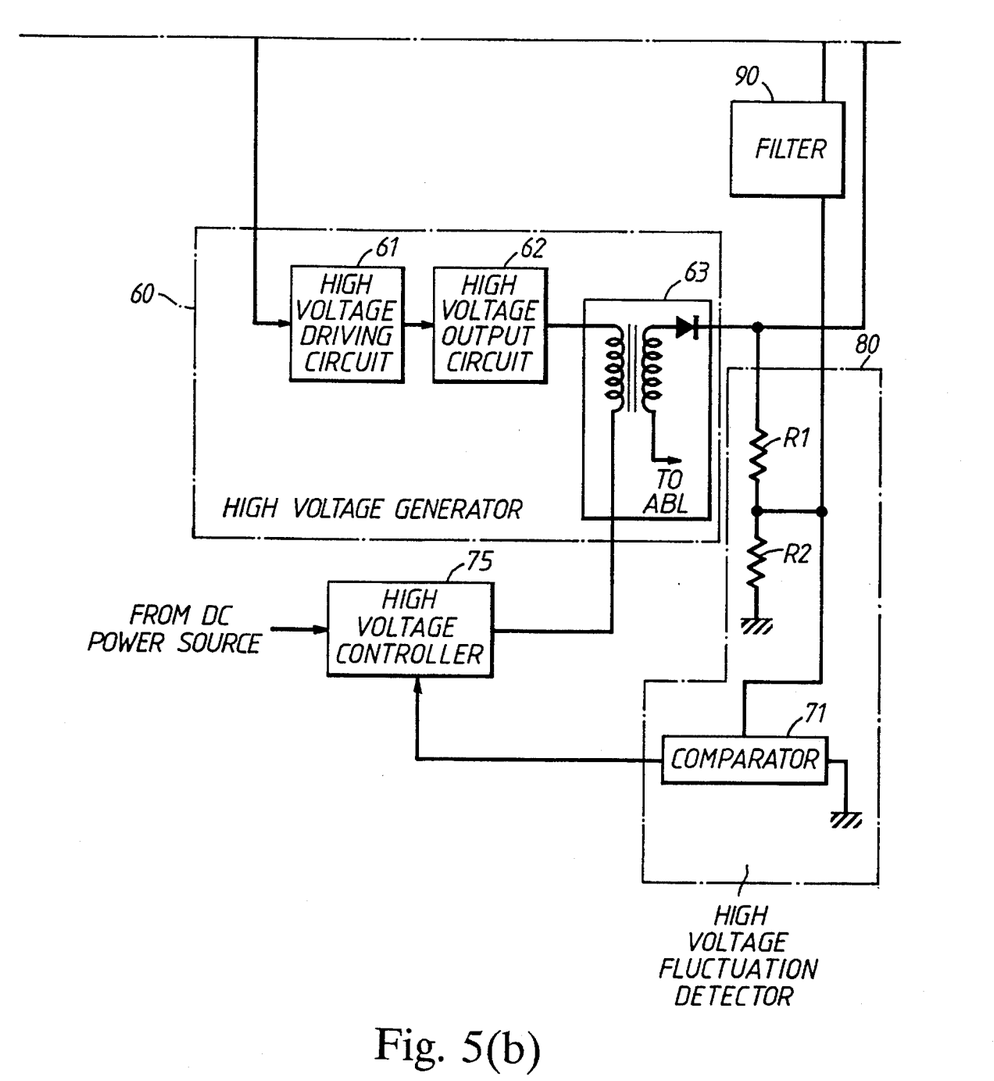

In FIGS 5(a) and 5(b), TV broadcasting waves are received by an antenna 1. Then a program channel corresponding to a channel data of a channel selector 50 is selected by a tuner 2. The output signal of the tuner 2 is supplied to a detector/amplifier circuit 3.

A composite video signal output from the detector/amplifier circuit 3 is supplied to an IC 4 which is comprised of a Y/C separation circuit for separating a luminance signal Y and a color difference signal C, a video processor for performing various signal processings for the luminance signal Y, a video chroma processor for reproducing R, G and B signals from the color difference signal C, and a synchronization processing circuit for separating a horizontal periodic signal and a vertical periodic signal from the luminance signal Y.

The composite video signal is adjusted its video signal amplitude as well as its brightness level in the video processor. Then the R, G and B signals are generated from the luminance signal Y and the color difference signal C reproduced in the video chroma processor.

Outputs of R, G, B driving circuits 14 are supplied to respective cathodes of R, G and B projection picture tubes 21, respectively.

Further, a horizontal sync. signal H and a vertical sync. signal V output from the IC 4 are supplied to a synchronization/deflection circuit 30, while the horizontal sync. signal H is further supplied to a high voltage generator 60.

The synchronization/deflection circuit 30 is composed of a horizontal driving circuit 32, a horizontal output circuit 33, a horizontal output transformer 34 and a vertical output circuit 31.

The output of the horizontal output circuit 33 is supplied to horizontal deflection coils 100 mounted to the projection picture tubes 21 as well as to the horizontal output transformer 34. The output of the horizontal output transformer 34 is then supplied to an intermediate voltage circuit and a low voltage circuit (not shown) and the like.

Further, the horizontal output transformer 34 is connected to a convergence correction circuit 40. On the other hand, the vertical sync. signal V is supplied to the vertical output circuit 31. The output of this vertical output circuit 31 is then supplied to the vertical deflection coils 100 mounted to the projection picture tubes 21. In addition, the vertical output circuit 31 is connected to the convergence correction circuit 40.

The convergence correction circuit 40 is composed of a correction signal generator 41 which generates a horizontal periodic sawtooth wave, a vertical periodic sawtooth wave and a parabolic wave, and a matrix circuit 42 which generates signals for correcting various raster distortions by appropriately combining the horizontal periodic sawtooth wave, the vertical periodic sawtooth wave and the parabolic wave.

The output of this convergence correction circuit 40 is supplied to a driving amplifier 50 which drives the R, G and B projection picture tubes 21. Further the output of this driving amplifier 50 is supplied to sub-deflection coils 101 provided on the R, G and B projections picture tubes 21 for correcting picture image distortions, respectively.

The driving amplifier 50 is composed of six driving circuits in total for driving the R, G, B projection picture tubes 21 so as to correct horizontal and vertical deflections.

On the other hand, the horizontal sync. signal H supplied to the high voltage generator 60 is also supplied to a flyback transformer 63 via a high voltage driving circuit 61 and a high voltage output circuit 62. After rectified and smoothed at a circuit coupled to the secondary winding of the flyback transformer 63, a high voltage is supplied to anodes 26 of the projection picture tubes 21, respectively.

A high voltage stabilizer which is composed of a high voltage controller 75 and a high voltage fluctuation detector 80 is connected to the secondary winding of the flyback transformer 63 in the high voltage generator 60. Further, a high voltage ripple wave detected in the high voltage detector 80 is supplied to a multiplier 43 in the matrix circuit 42 via a horizontal component removing filter 90.

Figure 6:
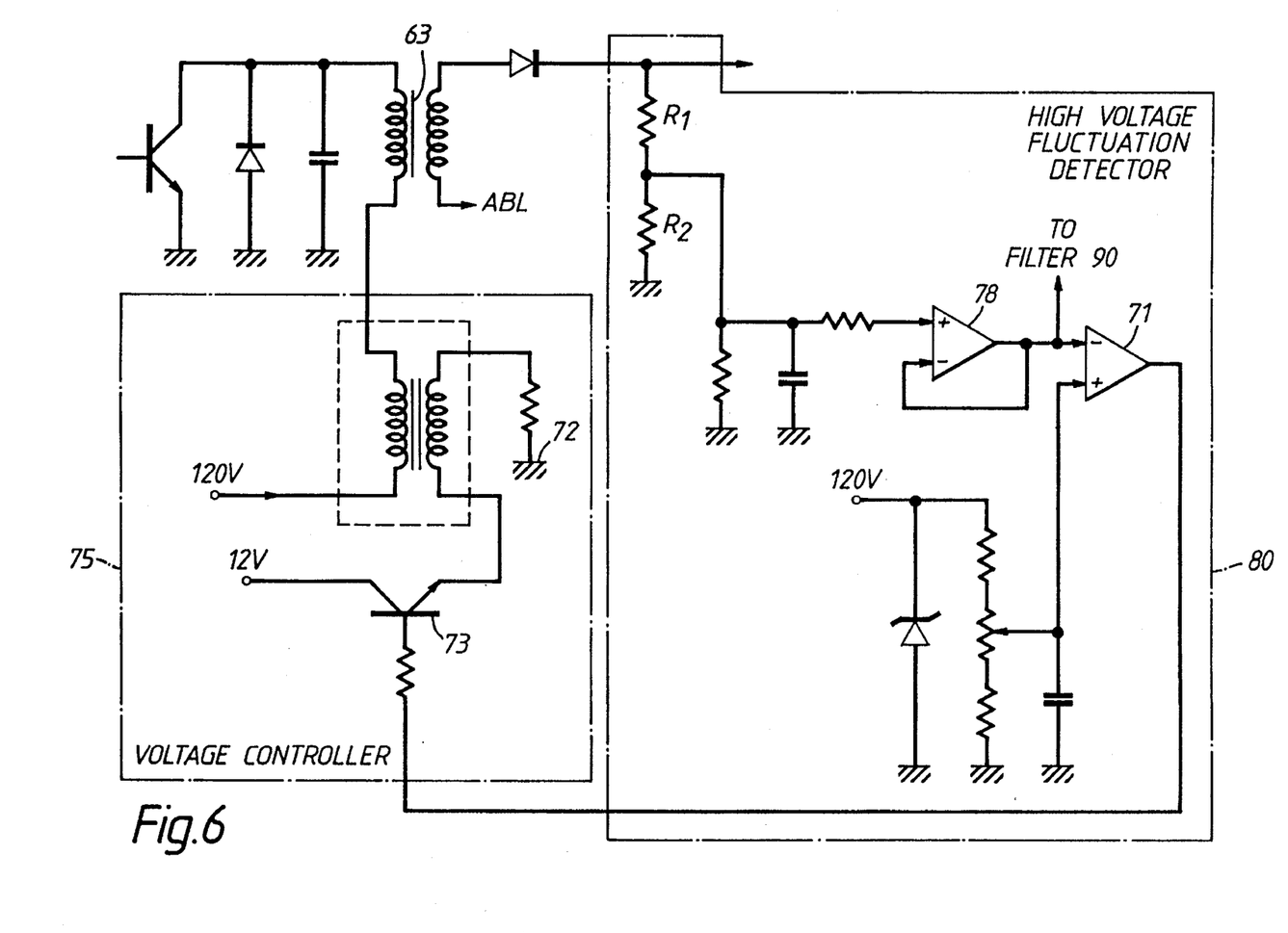
FIG. 6 is a diagram showing the construction of the high voltage fluctuation detector shown in FIG. 5.
Figure 7:
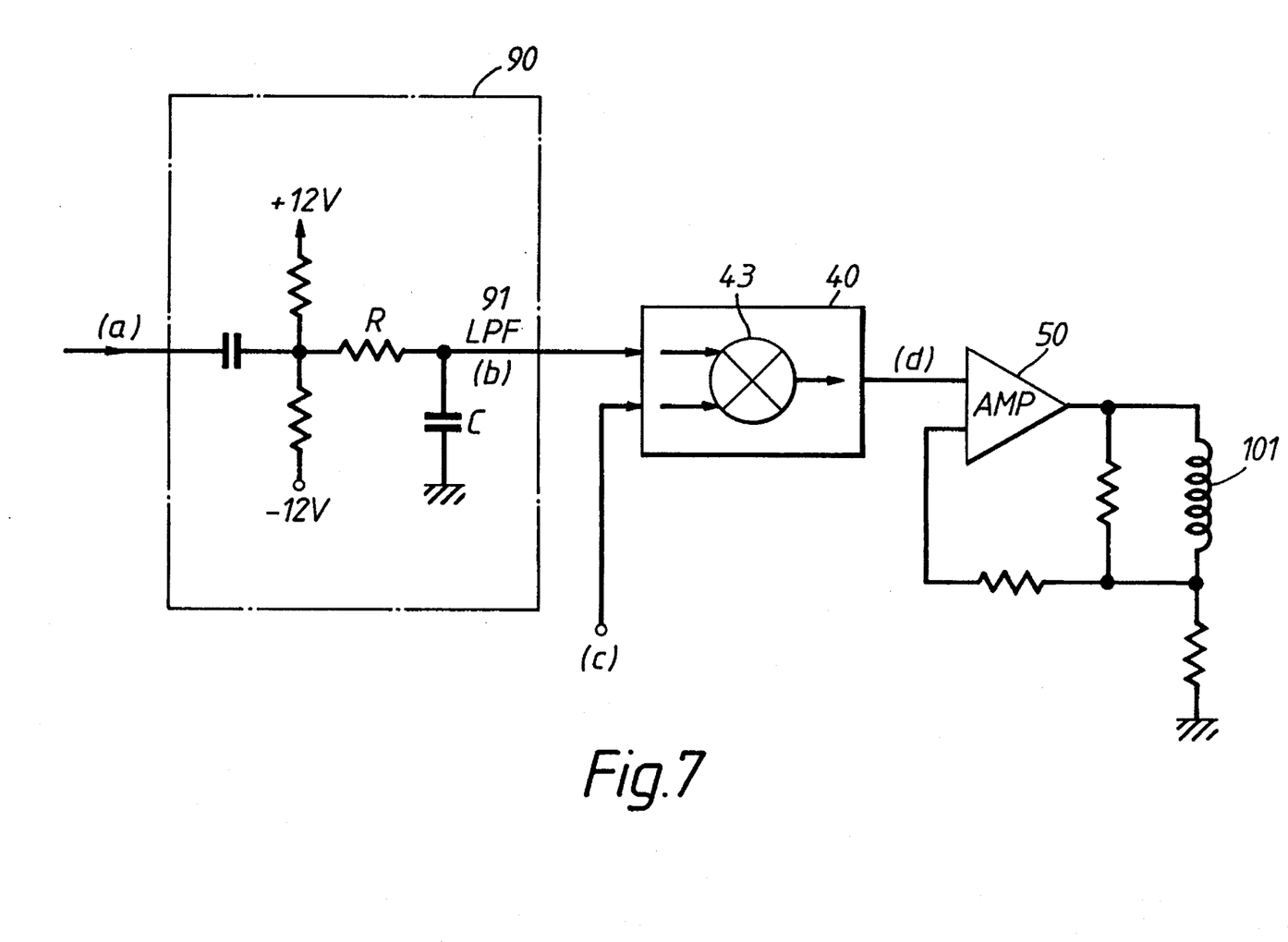
FIG. 7 is a diagram showing the construction of the convergence correction circuit shown in FIG. 5.

Here, the construction of the high voltage fluctuation detector 80 in FIG. 5(b) is illustrated in FIG. 6 in more detail. While the detailed constructions of the filter 90 and the convergence correction circuit 40 in FIG. 5(a) are also shown in FIG. 7.

As shown in FIG. 6, a high voltage controller 75 comprising a saturable reactor 72 and a control transistor 71 is coupled to the primary winding of the flyback transformer 63 so that the output of the high voltage detector 80 coupled to the secondary winding of the flyback transformer 63 is fed back to the primary winding so as to control the high voltage.

The high voltage fluctuation detector 80 is composed of a voltage divider constituted by a pair of resistors R1 and R2, a voltage follower circuit 78 and a comparator 71.

The filter 90 has a low-pass filter (LPF) 91 therein.

The output of the voltage divider formed by the resistors R1 and R2 is supplied to the filter 90 (see FIG. 7) and the comparator 71 via the voltages follower circuit 78, as shown in FIG. 6, the output of the filter 90 comprising a resistor R and a capacitor C is connected to the convergence correction circuit 40, as shown in FIG. 7.

Further the output of the comparator 71 is connected to the high voltage controller 75. The output of the filter 90 is also connected to the multiplier 43 in the matrix circuit 42. The arithmetically processed output from the matrix circuit 42 is supplied to the convergence coils 101 via the driving amplifier 50.

Referring now to FIGS. 8(a) through 8(d) and FIG. 9, operations of the circuits as shown in FIGS. 5(a) through 7 will be explained.

Figure 8A:
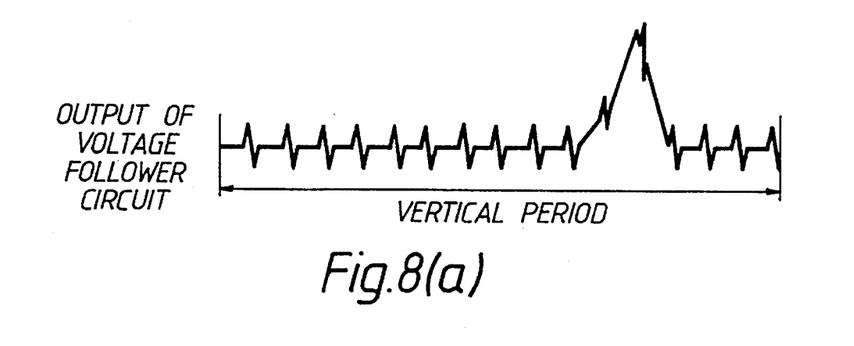
FIGS. 8(a) through 8(d) are diagrams showing waveforms at various sections of the convergence correction circuit shown in FIG. 7.
Figure 8B:
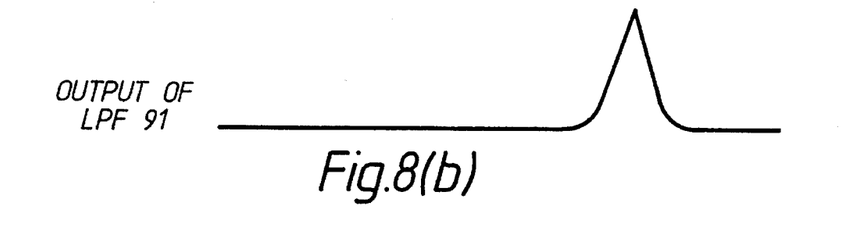
Figure 8C:
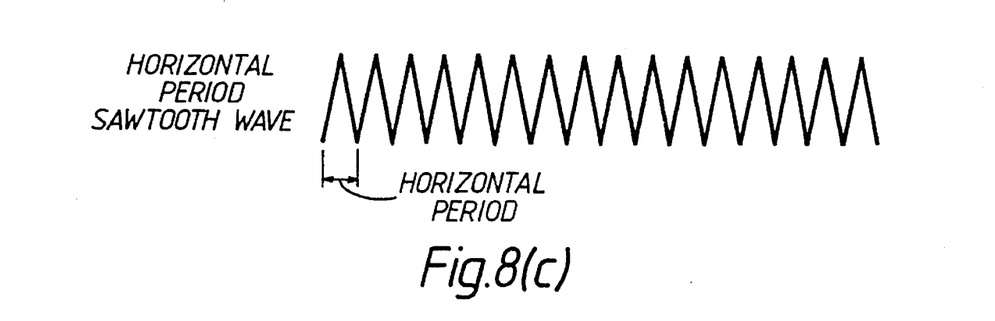
Figure 8D:
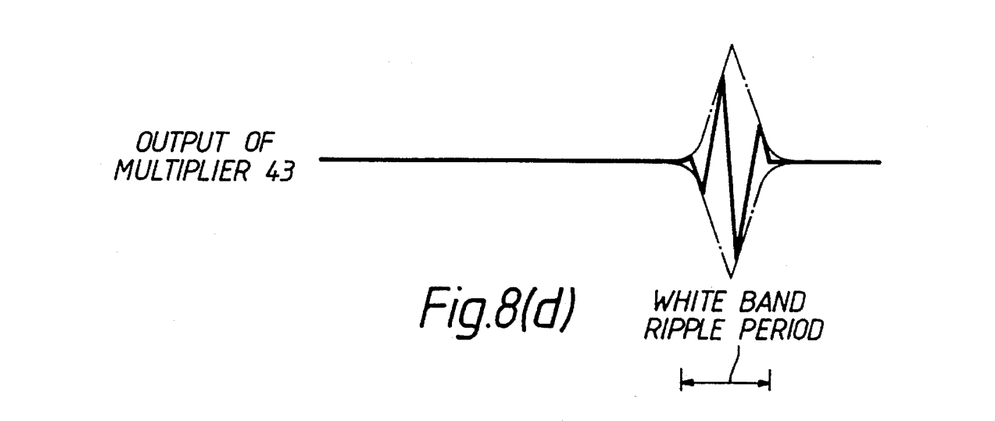
Figure 9:
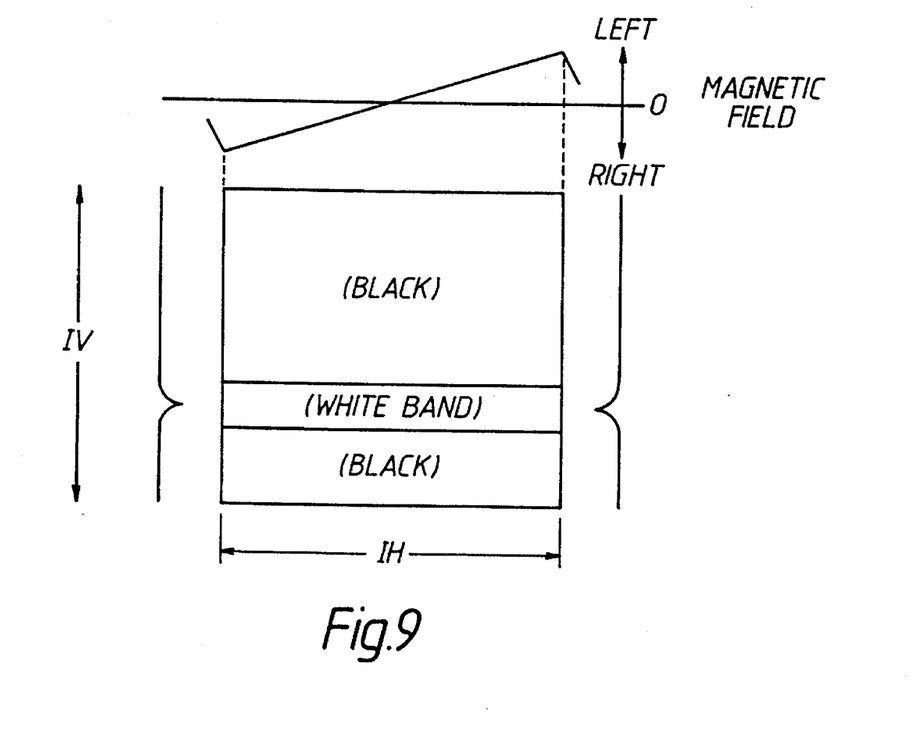
FIG. 9 is a diagram for explaining a correction of picture image distortions accompanied with a change of brightness level.

FIG. 8(a) shows the output waveform of the voltage follower circuit 78. FIG. 8(b) shows the output waveform of the low-pass filter (LPF) 91. FIG. 8(c) shows the horizontal periodic sawtooth wave. FIG. 8(d) shows the output waveform of the multiplier 43. FIG. 9 shows the relationship between the picture image distortions accompanied with a brightness change and its correction.

The vertical periodic high voltage ripple waveform accompanied with the brightness change is detected by the high voltage detector 80 (see FIG. 8(*a*)). This waveform includes horizontal and vertical periodic components. This waveform signal is supplied to the matrix circuit 42 after removed horizontal components at the low-pass filter 91 (see FIG. 8 (*b*)).

This output waveform of the low-pass filter 91 is multiplied with the sawtooth wave (see FIG. 8(*c*)) which is generated in the convergence correction signal circuit 41 based on the horizontal periodic pulse supplied from the horizontal output transformer 34 in an analog multiplier 43.

Thus a horizontal periodic sawtooth correction wave accompanied with a vertical periodic high voltage ripple level change, as shown in FIG. 8(*d*), is obtained.

This correction wave is supplied to the horizontal deflection driving amplifier 50 for driving the horizontal part of the convergence coil 101.

When this correction wave is applied to the horizontal part of the convergence coil 101 as a magnetic field, the picture image on the display screen is distorted to show a vertical periodic waveform, as shown in FIG. 9. The correction level depends on the horizontal periodic waveform so as that a magnetic field correction is applied to the right side of the screen at a negative voltage or to the left side of the screen at a positive voltage.

As shown in FIG. 9, the horizontal periodic waveform takes the maximum negative voltage at the left side of the screen so as that the magnetic field correction is directed toward the right side of the screen. The horizontal periodic waveform takes the maximum positive voltage at the right side of the screen so as that the magnetic field correction is directed toward the left side of the screen.

As a result, a picture image in an inverse form, as shown in FIG. 4, to the distorted picture image is applied thereto so as to cancel the distortion of the picture image.

In case of the three-projection picture tube type color television receiver, it is possible to prevent not only a burst distortion of scanning lines and at the same time, but also color discrepancies by cancelling distortions of picture images according to the method described above.

Although the above embodiment of the present invention has been described for the CRT projection color television receiver, the present invention is not limited to the embodiment but the same effect can be obtained when applied to the convergence correction apparatus for general color television receivers.

As described above, the present invention can provide an extremely preferable convergence correction apparatus. That is, the convergence correction apparatus becomes possible not only to make a real time correction for distortions of picture image caused by high voltage ripples occurring with a rapid brightness change on the picture images (either still pictures or motion pictures), but also to prevent color discrepancies and color distortions.

Furthermore, in case of the normal CRT color television receivers including convergence correction apparatus therein for removing optical distortions, the convergence correction apparatus is possible to make the receiver inexpensive but higher in quality as it can be constructed easily by utilizing existing circuits.

While there have been illustrated and described what are at present considered to be preferred embodiments of the present invention, it will be understood by those skilled in the art that various changes and modifications may be made, and equivalents may be substituted for elements thereof without departing from the true scope of the present invention.

In addition, many modifications may be made to adapt a particular situation or material to the teaching of the present invention without departing from the central scope thereof.

Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims.

The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A convergence correction apparatus for a picture image display device, comprising:
   a picture tube provided with an anode and a convergence coil, for displaying a picture image;
   means for receiving a composite video signal:
   means for separating a horizontal periodic pulse and a vertical periodic pulse from the composite video signal;
   convergence means responsive to the horizontal periodic pulse for generating a high voltage convergence signal to be applied to the anode of the picture tube;
   means for detecting a fluctuation of the high voltage convergence signal;
   means for generating a high voltage ripple signal corresponding to the fluctuation;
   means for generating a convergence correction signal including at least one of a horizontal periodic sawtooth wave signal, a vertical periodic sawtooth wave signal and a parabolic wave signal based on the horizontal periodic pulse and a vertical periodic pulse;
   means for adjusting the convergence correction signal by arithmetically processing the convergence correction signal with the high voltage ripple signal; and
   means for supplying the convergence coil of the picture tube with the adjusted convergence correction signal to cancel distortions of a picture image displayed in associated with the picture tube.

2. A convergence correction apparatus as claimed in claim 1, wherein the high voltage ripple signal generating means includes a filter for removing a vertical periodic component from the high voltage ripple signal.

3. A convergence correction apparatus for a picture image display device, comprising:

picture image projection means including red (R), green (G) and blue (B) monochrome projection picture tubes, for displaying a color picture image, each of which is provided with an anode and a convergence coil;

means for receiving a composite video signal;

means for separating a horizontal periodic pulse and a vertical periodic pulse from the composite video signal;

convergence means responsive to the horizontal periodic pulse for generating R, G and B high voltage convergence signals to be applied to the another of the R, G and B projection picture tubes;

means for detecting fluctuations of the R, G and B high voltage convergence signals;

means for generating R, G and B high voltage ripple signals corresponding to the fluctuations associated with the R, G and B high voltage convergence signals;

means for generating R, G and B convergence correction signals each including at least one of a horizontal periodic sawtooth wave signal, a vertical periodic sawtooth wave signal and a parabolic wave signal based on the horizontal periodic pulse and a vertical periodic pulse;

means for adjusting the R, G and B convergence correction signals by arithmetically processing the R, G and B convergence correction signals with the R, G and B high voltage ripple signals; and means for supplying the R, G and B convergence coils of the R, G and B projection picture tubes with the adjusted R, G and B convergence correction signals to cancel distortions of R, G and B picture images displayed in associated with the R, G and B projection picture tubes.

* * * * *